L. L. BRANDE.
APPROACH FOR RACK RAILS.
APPLICATION FILED OCT. 27, 1906.
1,137,694. Patented Apr. 27, 1915.
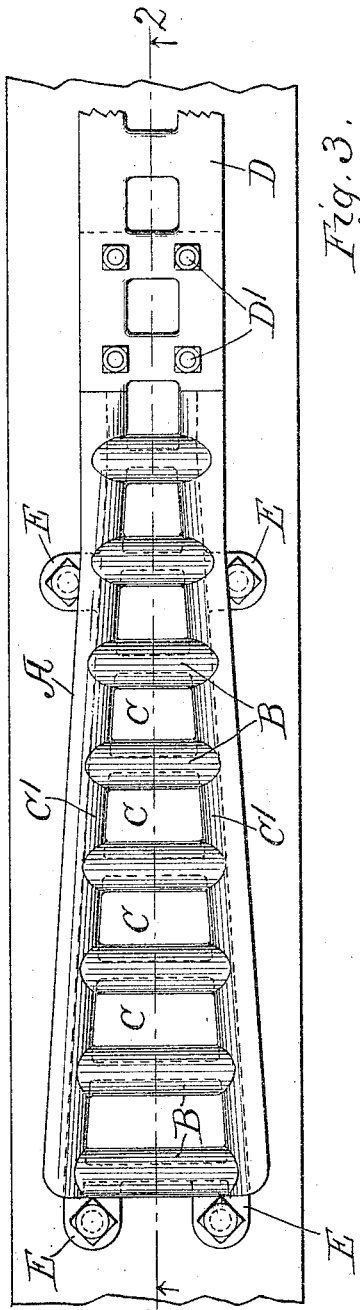
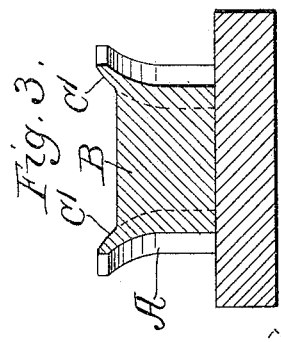
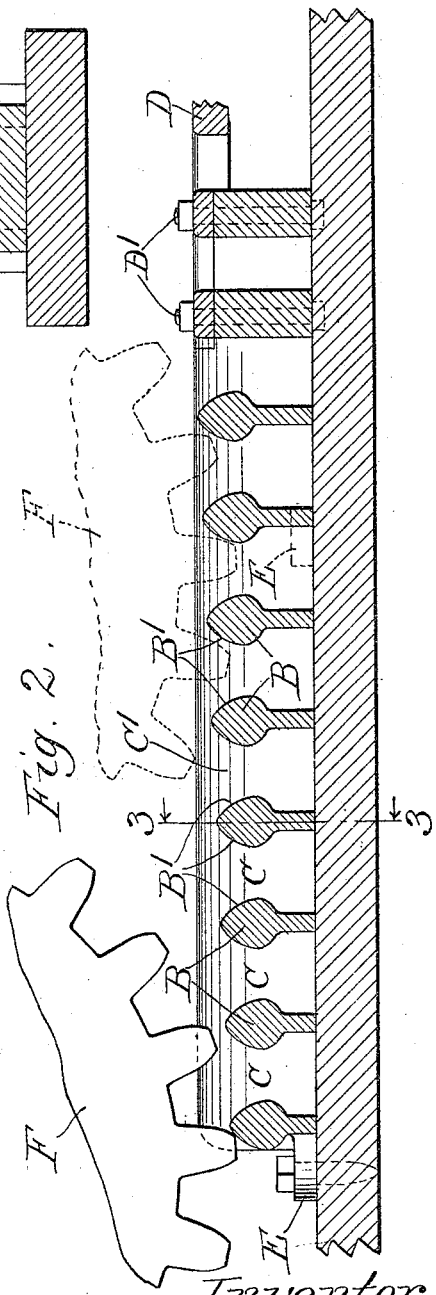
Witnesses.
Edward T. Wray.
Edna K. Reynolds
Inventor.
Louis L. Brande
by Parker & Carter
Attorneys.

UNITED STATES PATENT OFFICE.

LOUIS L. BRANDE, OF PITTSBURGH, PENNSYLVANIA, ASSIGNOR TO GOODMAN MANUFACTURING COMPANY, OF CHICAGO, ILLINOIS, A CORPORATION OF ILLINOIS.

APPROACH FOR RACK-RAILS.

1,137,694. Specification of Letters Patent. Patented Apr. 27, 1915.

Application filed October 27, 1906. Serial No. 340,825.

*To all whom it may concern:*

Be it known that I, LOUIS L. BRANDE, a citizen of the United States, residing at Pittsburgh, in the county of Allegheny and State of Pennsylvania, have invented a certain new and useful Improvement in Approaches for Rack-Rails, of which the following is a specification.

This invention relates to approaches for rack rails, and has for its object to provide a new and improved invention of this description.

Referring to the accompanying drawings, Figure 1 is a plan view of a rack rail approach embodying the invention; Fig. 2 is a longitudinal sectional view taken on line 2—2 of Fig. 1; Fig. 3 is a sectional view taken on line 3—3 of Fig. 2.

Like letters refer to like parts throughout the several figures.

In the operation of rack rail locomotives it is found that when the sprocket wheel of the locomotive has been out of engagement with the rack, and then approaches such rack, it seldom is in position so that the teeth of the sprocket wheel will mesh with the teeth of the rack, and some means must be provided to secure this result.

One of the objects of this invention is to bring the teeth of the sprocket wheel on the locomotive into mesh with the teeth of the rack.

As shown in the drawings, the rack rail approach A is connected with the end of the rack in any desired manner, and is provided with a series of teeth B separated by spaces C. These teeth and spaces increase in length from one end of the approach to the other, that is, from the end attached to the rack toward the outside of the rack. The teeth B are provided with the beveled faces B¹, the upper ends of these teeth being preferably enlarged for this purpose as shown. The material at the end of the openings C is also beveled as shown at C¹ so that at whatever point the tooth of the sprocket wheel strikes, it will come into contact with a beveled surface. The approach A is connected to the end of the rack D in any desired manner, as by means of suitable bolts D¹. The approach is also fastened to a fixed support in any desired manner, as, for example, by means of bolts or the like passing through lugs E. The teeth B preferably gradually increase in height from the outer end toward the end connected with the rack. When the sprocket wheel F, for example, approaches the end of the approach and its teeth are not in proper position to mesh with the teeth of the approach, the teeth of the sprocket wheel will strike the beveled faces B¹ of the teeth B and as the locomotive proceeds the weight thereof will cause a sliding movement of these beveled faces which will produce a sliding movement of the track wheels. It will thus be seen that by this means the sprocket wheel on the locomotive is gradually forced by the successive teeth of the approach to a position where the teeth of the sprocket wheel properly mesh with the teeth of the approach. As the sprocket wheel then passes on to engagement with the rack the teeth thereof will properly engage the teeth of the rack. The position of the sprocket wheel when out of proper mesh is shown in full lines in Fig. 2, and its position when brought into mesh is shown in dotted lines in said figure.

If, now, the sprocket wheel of the locomotive is out of place laterally, that is, is too far to one side, the elongated teeth at the end of the approach will engage it and the beveled faces C¹ at the ends of the spaces C will gradually force it to the middle position where it will be in proper alinement with the rack D. The sprocket wheels on the locomotives are ordinarily arranged so that they may be moved laterally to adjust themselves to inequalities in the rack, and consequently are liable to be out of alinement, particularly in passing from one section of the rack to another. It will thus be seen that by means of this construction the sprocket wheel of the locomotive will be brought into its proper alinement with the rack and also into proper mesh therewith, and that its proper engagement of the rack is thus assured.

I claim:

1. An approach for rack rails comprising a series of teeth with spaces between them and connected together at their ends by connecting pieces, said connecting pieces projecting above the teeth at one end of the approach the distance said connecting pieces project above said teeth decreasing toward the other end of said approach.

2. An approach for rack rails comprising a series of teeth with spaces between them and connected together at their ends by connecting pieces, said connecting pieces projecting above the teeth at one end of the approach, the distance said connecting pieces project above said teeth decreasing toward the other end of the approach, the inner faces of said connecting pieces being curved.

3. An approach for rack rails comprising a series of teeth with spaces between them and connected together at their ends by connecting pieces, said connecting pieces projecting above the teeth at one end of the approach and gradually approaching the tops of the teeth toward the other end of the approach, the opposed faces of said connecting pieces above said teeth formed into continuous curved faces.

LOUIS L. BRANDE.

Witnesses:
PERCIVAL H. TRUMAN,
EDNA K. REYNOLDS.

Copies of this patent may be obtained for five cents each, by addressing the "Commissioner of Patents, Washington, D. C."